(12) United States Patent
Jiang et al.

(10) Patent No.: US 12,505,357 B2
(45) Date of Patent: Dec. 23, 2025

(54) COMMUNICATING MACHINE LEARNING MODEL PARAMETERS

(71) Applicant: Kabushiki Kaisha Toshiba, Tokyo (JP)

(72) Inventors: Nan Jiang, Bristol (GB); Usman Raza, Bristol (GB); Pietro E. Carnelli, Bristol (GB); Aftab Khan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 1074 days.

(21) Appl. No.: 17/454,925

(22) Filed: Nov. 15, 2021

(65) Prior Publication Data

US 2023/0153637 A1 May 18, 2023

(51) Int. Cl.
*G06N 5/022* (2023.01)
*H04L 47/43* (2022.01)

(52) U.S. Cl.
CPC ............. *G06N 5/022* (2013.01); *H04L 47/43* (2022.05)

(58) Field of Classification Search
CPC .......... G06N 5/022; G06N 20/00; G06N 5/08; G06N 5/098; G06N 20/20; G06N 3/08; G06N 3/098; G06N 7/005; H04L 47/43; H04L 67/104; H94L 47/43
USPC .......................................... 370/474; 709/236
See application file for complete search history.

(56) References Cited

U.S. PATENT DOCUMENTS

| | | | | |
|---|---|---|---|---|
| 10,956,485 B2* | 3/2021 | Lee | ........................ | G06F 16/433 |
| 11,343,279 B2* | 5/2022 | Srinivasan | ............ | H04L 43/028 |
| 11,507,836 B1* | 11/2022 | Kurz | .................... | G06N 3/0455 |
| 11,593,406 B2* | 2/2023 | Rao | ...................... | G06F 16/2379 |
| 2015/0324686 A1* | 11/2015 | Julian | ...................... | G06N 3/08 706/25 |
| 2017/0091668 A1* | 3/2017 | Kadav | ........................ | G06F 9/46 |
| 2018/0232371 A1* | 8/2018 | Lee | ......................... | G06F 16/433 |
| 2019/0182364 A1* | 6/2019 | Dwight | ............... | H04L 61/5092 |
| 2020/0027009 A1* | 1/2020 | Khan | ....................... | G06N 7/01 |
| 2020/0205200 A1* | 6/2020 | Newman | ............ | H04W 74/006 |
| 2021/0357800 A1* | 11/2021 | Sharma | .................. | G06N 20/00 |
| 2021/0374608 A1* | 12/2021 | El-Khamy | ............. | G06N 20/20 |

(Continued)

OTHER PUBLICATIONS

U.S. Appl. No. 16/952,705, filed Nov. 19, 2020, Anwar et al.

(Continued)

*Primary Examiner* — James N Fiorillo
(74) *Attorney, Agent, or Firm* — Oblon, McClelland, Maier & Neustadt, L.L.P.

(57) ABSTRACT

A method for communicating a plurality of numerical parameter updates of a machine learning model from a first node to a second node. The method includes dividing each of the parameter updates into a respective primary segment and one or more respective additional segments, wherein the primary segment of each parameter update is the segment that has the greatest influence on the value of that parameter update. The method further includes constructing primary packet containing the primary segments of each of the plurality of parameter updates, and one or more additional packets including the one or more additional segments of the plurality of parameter updates. The method further includes transmitting the plurality of packets from the first node, wherein the primary packet is transmitted with a higher priority than any of the one or more additional packets.

17 Claims, 7 Drawing Sheets

(56) References Cited

U.S. PATENT DOCUMENTS

| | | | | |
|---|---|---|---|---|
| 2022/0036176 | A1* | 2/2022 | Megretski | G06N 3/063 |
| 2022/0360539 | A1* | 11/2022 | Chen | G06N 3/098 |
| 2022/0383859 | A1* | 12/2022 | Mimassi | G10L 15/16 |
| 2022/0391781 | A1* | 12/2022 | Litany | G06N 3/098 |
| 2023/0059162 | A1* | 2/2023 | Pack | G06N 3/0495 |
| 2023/0133722 | A1* | 5/2023 | Van Vaerenbergh | G06N 3/045 |
| | | | | 706/10 |
| 2023/0177349 | A1* | 6/2023 | Balakrishnan | H04L 67/10 |
| | | | | 706/25 |
| 2023/0189319 | A1* | 6/2023 | Akdeniz | G06N 3/084 |
| | | | | 370/329 |
| 2023/0385652 | A1* | 11/2023 | Zhu | G06N 20/00 |
| 2024/0023082 | A1* | 1/2024 | Mu | H04W 72/12 |
| 2024/0127114 | A1* | 4/2024 | Reyes | G06N 3/08 |
| 2024/0202528 | A1* | 6/2024 | Wang | G06N 3/04 |
| 2024/0334462 | A1* | 10/2024 | Chen | H04W 72/51 |

OTHER PUBLICATIONS

Chen et al., "Wireless Communications for Collaborative Federated Learning", 2020, 17 pages, arXiv preprint arXiv:2006.02499.

* cited by examiner

COMMUNICATING MACHINE LEARNING MODEL PARAMETERS

FIELD

Embodiments described herein relate to methods of communicating parameters of machine learning models.

BACKGROUND

Federated learning is a distributed machine learning approach in which a plurality of edge devices train local machine learning models using their own local data. The trained local models, or parameters thereof, are then aggregated to generate or update a global machine learning model without sharing the local data with which the local models were trained. Such federated learning approaches are frequently employed in internet of things (IoT) systems.

Arrangements of the embodiments will be understood and appreciated fully from the following detailed description, made by way of example only and taken in conjunction with the drawings in which.

DETAILED DESCRIPTION

Figures 1, 2:
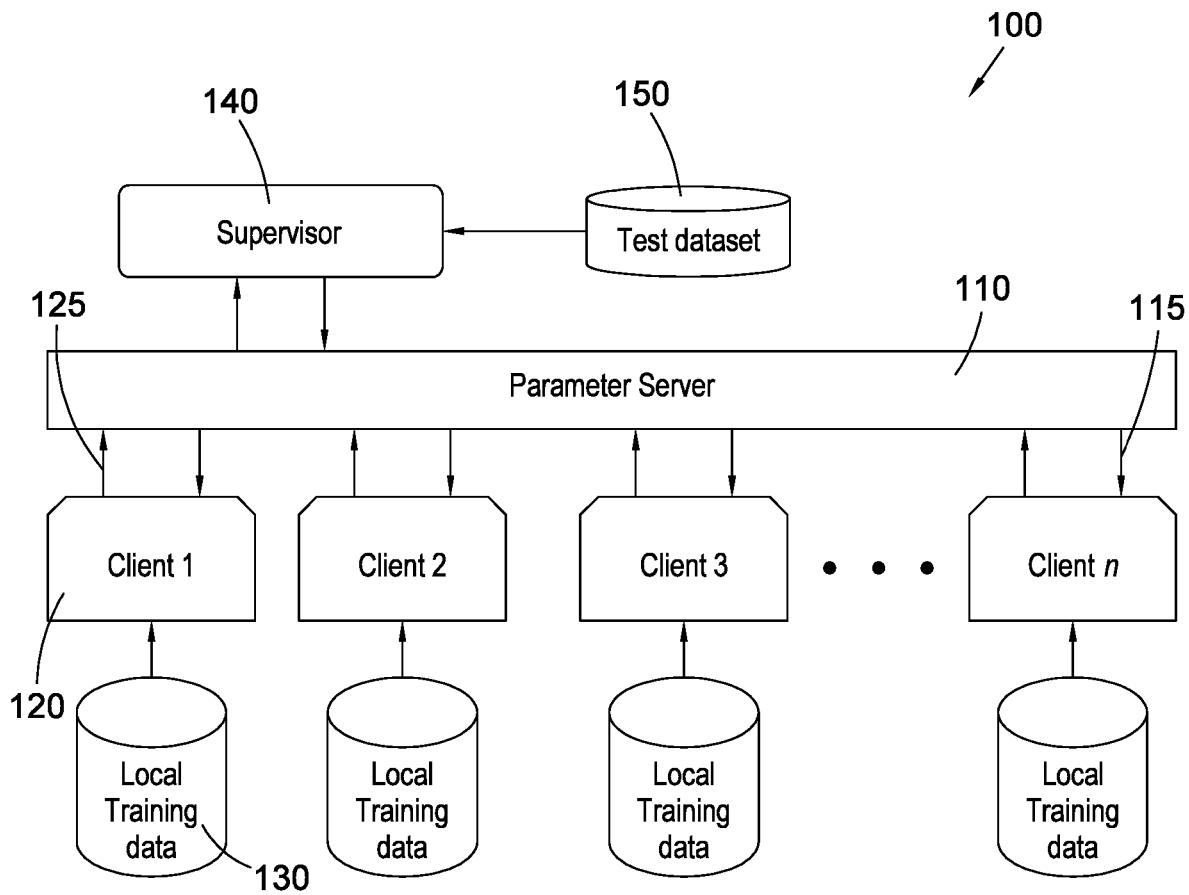
FIG. 1 shows an example of a federated learning deployment.
FIG. 2 shows an example of machine learning model parameter updates exchanged between nodes in a federated learning deployment.

According to an embodiment, there is provided a method for communicating a plurality of numerical parameter updates of a machine learning model from a first node to a second node, the method comprising dividing each of the parameter updates into a respective primary segment and one or more respective additional segments, wherein the primary segment of each parameter update is the segment that has the greatest influence on the value of that parameter update; constructing a primary packet containing the primary segments of each of the plurality of parameter updates, and one or more additional packets comprising the one or more additional segments of the plurality of parameter updates; and transmitting the plurality of packets from the first node, wherein the primary packet is transmitted with a higher priority than any of the one or more additional packets.

In some embodiments, each parameter update is a floating-point number comprising an exponent and a mantissa; wherein the primary segment of each parameter update may comprise the exponent of that parameter update.

The primary segment of each parameter update may further comprise one or more highest-order digits of the mantissa of that parameter update.

In some embodiments, each of the parameter updates comprises a sign and the primary segment of each parameter comprises the respective sign of that parameter update.

In some embodiments, the primary packet and the one or more additional packets of each parameter update together define a series of packets, with the primary segment having the greatest influence on the value of the parameter update, and each sequential subsequent additional packet of the series having a lower influence on the value of the parameter update.

The plurality of additional packets may be transmitted with different priorities and the order of the priorities with which the additional packets are transmitted may be the same as the order of the influences on the values of the parameter updates of the segments contained.

In some embodiments, packets transmitted with higher priorities are allowed greater numbers of retransmissions than packets transmitted with lower priorities.

In some embodiments, each of the parameter updates is divided into segments in the same manner.

In some embodiments, the method further comprises listening to receive the primary packet and the one or more additional packets with a second node; wherein, if the second node does not successfully receive at least one of the one or more additional packets, the second node determines substitute segments for each additional segment comprised by said at least one of the additional packets, and uses the substitute segments to construct estimates of each parameter update comprising an additional segment contained in one of said at least one additional segments.

One or more values of digits in the substitute segments may be randomly generated. In one embodiment the entire substitute segment is randomly generated.

One more values of digits in the substitute segments may be randomly generated based on a predefined distribution.

One more values of digits in the substitute segments may be generated based on one or more previous values of that digit in previous parameter updates of the same parameter. In one embodiment the substitute segment is a copy of the previous parameter update.

One more values of digits in the substitute segments may be set to a default value.

In an embodiment, there is provided a method of training a machine learning model in a federated learning deployment, the method comprising transmitting parameter updates according to a method of claim 9 at a plurality of stages; wherein in one or more earlier stages, the values of digits in the substitute segments are randomly generated or set to default values; and wherein later stages the values of digits in the substitute segments are randomly generated or set to default values; and wherein in one or more later stages, the values of digits in the substitute segments are generated based on one or more previous values of those digits in previous parameter updates of the same parameters.

The first node may be a node of a federated learning deployment/

According to an embodiment, there is provided a method or receiving a plurality of numerical parameter updates of a machine learning model, wherein each of the parameter updates comprises a respective primary segment and one or more respective additional segments, the primary segment of each parameter update being the segment that has the greatest influence on the value of that parameter update, the method comprising listening to receive a primary packet and one or more additional packets with a node; wherein the primary packet contains the primary segments of each of the plurality of parameter updates and the one or more additional packets comprise the one or more additional segments of the plurality of parameter updates; wherein, if the node does not successfully receive at least one of the one or more additional packets, the second node determines substitute segments for each additional segment comprised by said at least one of the additional packets, and uses the substitute segments to construct estimates of each parameter update comprising an additional segment contained in one of said at least one additional segments.

The method of receiving parameter updates may comprise any of the features described herein with reference to a method of communicating machine learning model parameter updates.

According to an embodiment, there is provided one or more non-transitory storage media comprising computer instructions executable by a one or more processing means, the computer instructions when executed by the processing means causing a first node to: divide each of a plurality of parameter updates of a machine learning model into a respective primary segment and one or more respective additional segments, wherein the primary segment of each parameter update is the segment that has the greatest influence on the value of that parameter update; construct a primary packet containing the primary segments of each of the plurality of parameter updates, and one or more additional packets comprising the one or more additional segments of the plurality of parameter updates; and transmit the plurality of packets, wherein the primary packet is transmitted with a higher priority than any of the one or more additional packets.

The computer instructions when executed by the processing means may cause any of the optional steps of methods of communicating parameter updates described herein.

According to an embodiment, there is provided network node for communicating a plurality of numerical parameter updates of a machine learning model, the node configured to: divide each of a plurality of parameter updates of a machine learning model into a respective primary segment and one or more respective additional segments, wherein the primary segment of each parameter update is the segment that has the greatest influence on the value of that parameter update; construct a primary packet containing the primary segments of each of the plurality of parameter updates, and one or more additional packets comprising the one or more additional segments of the plurality of parameter updates; and transmit the plurality of packets, wherein the primary packet is transmitted with a higher priority than any of the one or more additional packets.

The node may comprise and/or be configured to perform any of the optional features of methods of communicating parameter updates described herein.

Embodiments described herein relate to methods of communicating parameter updates of machine learning models, for example, between nodes of a federated learning deployment, and to systems configured to employ such methods.

FIG. 1 shows an example of a federated learning deployment 100 in which embodiments of methods and systems for communicating model parameter updates may be used. The deployment 100 comprises a central parameter server 110 and a plurality of client edge devices 120 (clients 1 through n) each configured to communicate with the central server 110 and to train a machine learning model. The central server 110 and edge devices 120 define a central node 110 and a plurality of edge nodes 120 of the deployment 100 respectively.

In use, each of the edge devices 120 separately trains a local machine learning models using a respective local training dataset 130, the local model being a local copy of a global machine learning model trained by the federated learning deployment 100. The local training dataset 130 may be stored on, received by, and/or obtained by that edge device 120, and/or may be unique to that edge device 120. The initial parameters of the local copies of the machine learning model on each edge device 120 may be distributed 115 by the central server 110, or may be randomly initialised. Training each local model changes parameters (such as weights or biases where the model is a neural network) of that model.

After training their local models for one or more training iterations, the edge devices 120 each transmit 125 updates on parameters of their trained local model, to the central server 110. The parameter updates may comprise any combination of new values of the parameters, changes to the parameters from previous values (which may have been distributed 115 by the central server) after one or more training iterations, and/or gradients of a loss function of the model with respect to the respective parameters after a training iteration.

The central server 110 then aggregates the parameter updates of the multiple local models provided by the plurality of edge devices 120 to update the parameters of the global model. The updated global model, or parameters thereof, may subsequently be redeployed to the edge devices 120, and/or to other devices, for use and/or for further training.

The edge devices provide their parameter updates to the central server 110 without providing the local data on which their local models were trained, this may advantageously reduce the volume of data exchanged and increase the privacy of the local data 130.

The edge devices 120 may be servers, smartphones, or other computing devices. The illustrated deployment 100 comprises at least four edge devices 120, however, it will be appreciated that deployments may comprise any number of multiple edge devices 120. In some deployments, the edge devices 120 may collect their own data with which they train their local models. For example, edge devices 120 may comprise sensors, which may detect the data used to train their local models.

The illustrated federated learning deployment 100 is a centralized deployment, in which a central server 110 (such as a cloud and/or backend server) distributes the initial global model and aggregates the multiple local models to form the updated global model. It will be appreciated that embodiments of methods and systems described herein may also be used in decentralized federated learning deployments in which the plurality of edge devices 120 communicate with each other to distribute the initial global model and/or to aggregate their local models to form the updated global model.

The illustrated federated learning deployment 100 additionally comprises a supervisor 140 configured to communicate with the central server 110, the supervisor storing, receiving, or obtaining a test dataset 150, for example to validate a trained global model.

As described above, federated learning techniques involve exchanging parameter updates for machine learning models between nodes 110, 120 of machine learning deployments, such the deployment 100 shown in FIG. 1. After edge nodes 120 train their local models using their local data 130, they must transmit parameter updates of their updated models to the central node 110 (in centralized federated learning deployments), or to other edge devices 120 (in decentralized federated learning deployments). Additionally, initial and/or updated parameters of the global model may be transmitted between nodes 110, 120 (for example, updated parameters of the global model may be distributed 115 to each of the worker devices 120 in an initialisation step and after each updated to the global model).

After changes to a model's parameters (for example, changes to a local model's parameters during training, or to the global model's parameters during aggregation), updates to these parameters may be transmitted as any combination of their new values, and/or changes relative to original values (such as values of parameters of a local model before training, or of a previously distributed global model). Changes relative to original values of parameters may be gradients of a loss function of the model with respect to those parameters after a training iteration.

Each individual machine learning model (such as the local model of an edge device 120) may typically be defined by a large number of parameters (such as weights and or biases where the model is a neural network). The parameter updates are numerical values which may be recorded and transmitted with a high resolution (for example, to a large number of significant figures) and whose values may span a range of several orders of magnitude. FIG. 2 show a portion of an example of a set of parameter updates of a machine learning model, including more than fifty numerical parameters, ranging between 0.00011808079719543458 and 2.4623391032218936e-06.

Figure 3:
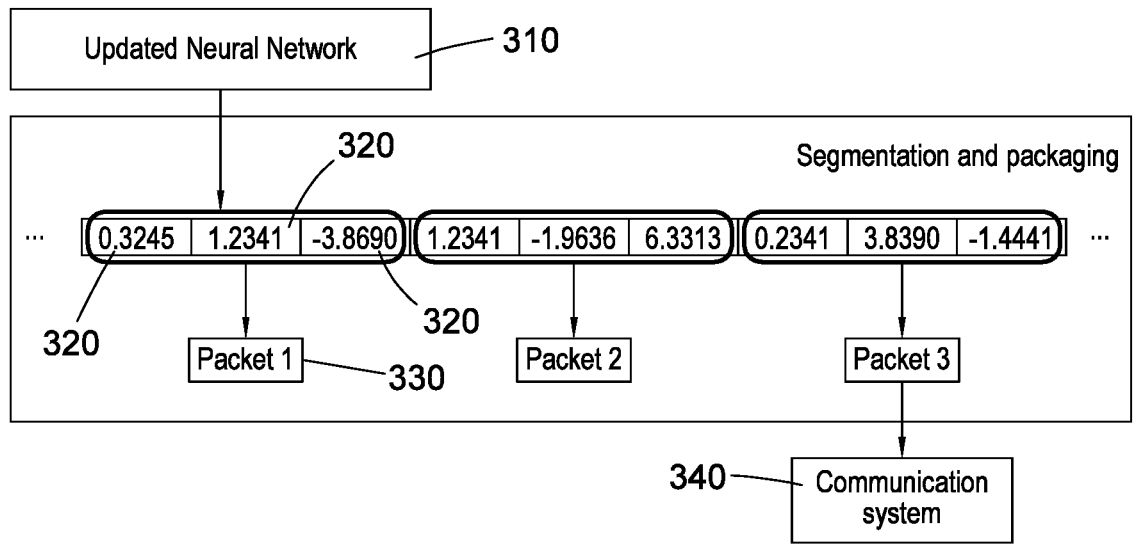
FIG. 3 shows an example of a conventional method of packaging parameter updates into packets.

Transmitting the parameters of a machine learning model from one node to another must therefore typically be done using a plurality of network packets. In pre-existing techniques, this may be performed by packaging different parameter's updates into different packets. FIG. 3 shows an example of nine parameter updates 320 to a neural network model 310 being packaged into three separate packets 330, each comprising three of the parameter updates 320 in their entirety. These packets may be transmitted by a communication means 340 comprised by the transmitting node.

However, if a node to which the packets 320 are transmitted does not successfully receive one or more of the packets 320, the receiving node will receive no information on the parameter updates 320 contained therein. As changes to parameters may be interrelated, generally if some parameter updates from a transmitting node are not received, the receiving node must discard all parameter updates from that node in order to guarantee the stability of the model. Nodes may fail to receive transmitted packets due to overloading of a wireless system by which they are comprised, link outages between the nodes, interference, and/or collisions between transmissions of multiple nodes.

Embodiments described herein relate to methods of communicating parameter updates in which individual parameter updates are divided into parts transmitted in different packets, with packets containing more significant parts of the parameter updates having higher priorities in order to increase the likelihood that they are successfully received. Such embodiments mitigate the risk of entire parameter updates not being successfully received.

Figure 4:
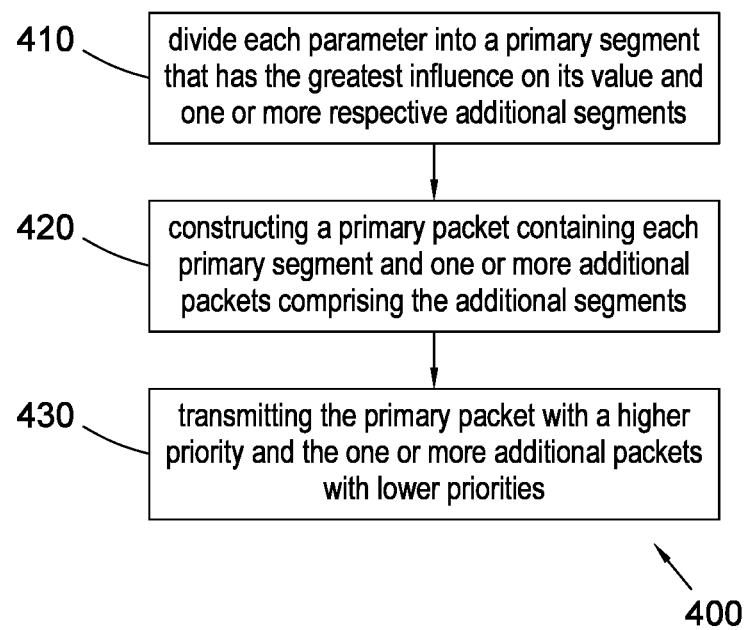
FIG. 4 is a flowchart of an embodiment of a method of communicating parameter updates.

FIG. 4 is a flowchart of an embodiment of a method 400 for communicating numerical parameter updates of a machine learning model.

The parameter updates may be parameter updates of a machine learning model in a federated learning deployment, such as a deployment 100 as described above with reference to FIG. 1. The parameter updates may be updates to a local copy of the model due to training by an edge device, or may be updates to a global model due to aggregation of multiple local model's parameter updates. The parameter updates may be any combination of new values and/or changes to previous values. The transmitted parameter updates may be calculated parameter updates to a full precision to which they have been calculated or generated. The plurality of parameter updates may together define a vector. In some embodiments, the parameter updates are floating point numbers.

In a first step 410 of the method 300, each of the plurality of parameter updates is divided into a plurality of segments. The plurality of segments comprise a primary segment which has the greatest influence on the value of the parameter update, and one or more additional packets.

The parameter updates are divided into multiple segments, in order to enable the segments to be transmitted in different packets with different priorities in the subsequent steps 420, 430 of the method. This advantageously ensures that a packet being dropped does not lose all information on a parameter updated and allows the parameter updates' that have the greatest influence on their values to be transmitted with a higher priority, increasing the likelihood that they will be successfully received.

The priority with which a packet is transmitted is a measure of in how reliable a manner it is transmitted. Packets transmitted with higher priorities may be transmitted using higher quality of service (QoS) levels and/or using greater or more reliable network resources. For example, higher priority packets may be transmitted using more reliable network links (for example, with greater throughput or bandwidth), and/or may be allowed greater number of retransmissions. The priority may be a quality of service priority.

Each segment may comprise one or more digits of its respective parameter update, and/or one or more other characters (such as a sign, decimal point, or other radix point) that may not be represented by a digit when the parameter update is divided into segments.

One of the segments into which each parameter update is divided is that parameter update's respective primary segment that has the greatest influence upon its value. The contents of this segment may depend upon the format of the divided parameter update. If the numerical parameter is a binary number, the most significant segment may comprise the most significant bit thereof (such as a sign bit), and/or one or more most significant bits thereof.

The primary segment of a parameter update may comprise a sign if that parameter update is in a signed format.

The primary segment of a parameter update may comprise an exponent (and/or one or more highest-order digits thereof) if that parameter update is a floating point number (or is any other exponential formats). The primary segment may further comprise a base of the exponent if the base of the parameter update is not pre-set and is therefore to be transmitted.

The primary segment of the parameter update may comprise one or more highest-order digits of that parameter update. For example, the primary segment of a floating point parameter update may comprise one or more highest order digits of a mantissa of the parameter update, or the primary segment of a . . . such as a fixed point number parameter update, may comprise the one or more highest order digits thereof.

In some embodiments, each of the parameter updates is a floating point number, which comprises an exponent and a mantissa (i.e. a significand). The parameter updates may each further comprise a sign, and may comprise a base. Alternatively, the base may be pre-set by a format of the parameter update, for example the base may be pre-set as two where the parameter update is a binary floating point number, or as ten where it is a decimal floating point number. If such floating point number parameter updates are signed, their primary segments each comprise at least their respective sign, if they are unsigned In some embodiments, the primary segments of such floating point number parameter updates comprise their exponent, as well as any sign if the parameter updates are signed and any base if their bases are not pre-set (and therefore known to the destination of the parameter updates). Such primary segments may further comprise one or more digits of their respective parameter update's mantissa, such as one or more highest-order digits thereof.

Figure 5A:
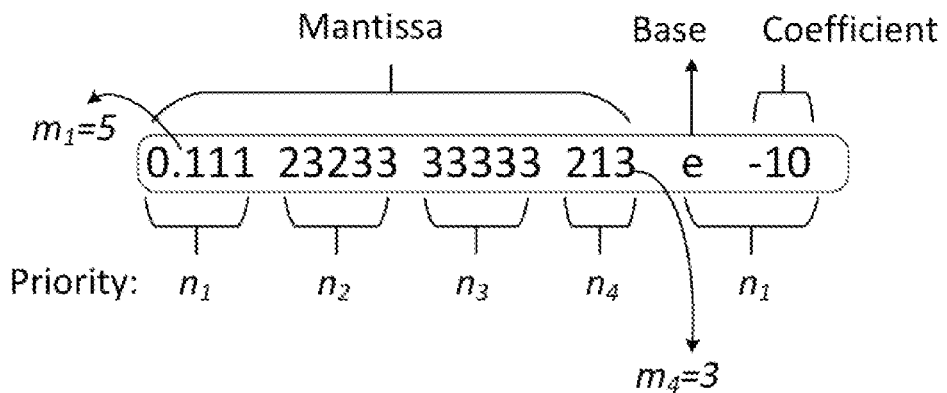
FIG. 5a shows a base 10 floating point number parameter update being divided into parts for transmission in different packets.
Figure 5B:
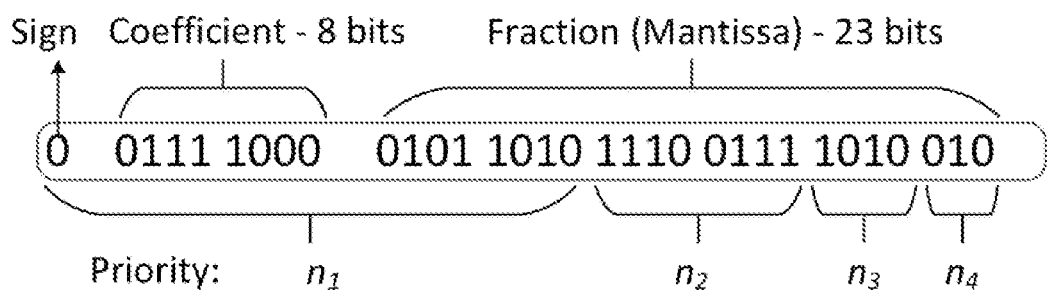
FIG. 5b shows a binary floating point number parameter update being divided into parts for transmission in different packets.

FIGS. 5a and 5b show examples of floating point number parameter updates being divided into multiple segments for transmission in different packets with different priorities, including primary segment comprising at least their exponents and the earliest (i.e. highest-order) digits of their mantissas.

FIG. 5a shows an example of an unsigned floating point number comprising a mantissa 0.1112323333333213, an exponent −10, and a base 10 (denoted using E notation), such that the parameter update is a decimal floating point number. This parameter update is divided into four segments, including a first segment comprising the exponent, the base, and a first earliest segment of the mantissa 0.111. The remainder of the parameter update (the remainder of the mantissa) is divided into a second segment 23233, a third segment 33333, and a fourth latest segment 213.

A non-binary parameter update, such as a base-10 parameter update as shown in FIG. 5a may be converted into a binary representation to be transmitted. In some embodiments, the parameter update may be divided into segments before such a conversion, and the individual segments (or elements thereof) may then be separately converted into binary, for example, using character encoding such as 7-bit ASCII or 8-bit Latin-x. Alternatively, the entire parameter update may be converted into a binary form, such as a binary floating point number, before it is divided into multiple segments.

For the parameter shown in FIG. 5a, the base is included in one of the segments (the primary segment) so that it can be communicated to a destination of the parameter updates. In other embodiments, the base may be pre-set and/or known to the destination. In such embodiments the base may not be included in one of the segments.

FIG. 5b shows an example of a binary floating point number parameter update in the IEEE-754 32-bit single precision representation comprising a mantissa 01011010111001111010010, an exponent 01111000, and a sign 0 (meaning the number is positive). The binary floating point number's base is necessarily 2 and this therefore is not specified. The number is divided into a primary segment and three additional segments. The primary segment comprises the sixteen most significant bits of the parameter update, including the sign, the exponent and the earliest seven digits of the mantissa, 01011010. The remainder of the parameter update (i.e. the remainder of the mantissa) is divided into a second segment 11100111, a third segment 1010, and a fourth latest segment 010.

In some embodiments, each of the parameter updates may be divided into respective segments in the same manner, i.e. the primary segment of each parameter update may comprise the same respective elements of that parameter update (for example, the exponent, the base and/or sign, and the first X digits of the mantissa), and each of the one or more additional segments of each parameter update may comprise the same elements of that respective parameter update (for example digits of that parameter update's mantissa in the same position)

The number of segments into which a parameter update is divided may be dependent upon its length or number of digits, or upon the length or number of digits of the longest of the parameter updates. The contents of (e.g. the number of digits in) each segment (or a maximum thereof) may be pre-set. For example, as shown in FIG. 5a each segment may comprise up to five digits of the mantissa (the decimal point being counted as a digit for this purpose), which each segment being filled until the end of the mantissa.

In some embodiments, the primary packet and the one or more additional packets of each parameter update may together define a series of packets, with the primary segment having the greatest influence on the value of the parameter update, and each sequential subsequent additional packet of the series having a lower influence on the value of the parameter update. For example, each additional packet may be defined by a subsequent segment of a series of digits comprised by the parameter update (such as a subsequent segment of a mantissa, as shown in FIGS. 5a and 5b, or a subsequent segment of a non-exponential parameter update).

In a second step 420 of the method, a plurality of packets comprising the segments of the parameter update are constructed. The plurality of packets comprise a primary packet containing the primary segments of each of the parameter updates, and one or more additional packets comprising the one or more additional segments of the parameter updates.

Some or all of the additional packets may comprise additional segments of multiple different parameter updates. In some embodiments, some or all of the packets may comprise an additional segment from each of the plurality of parameter updates. In such embodiment, the segments of each parameter update comprised by each of the some or all of the packets may comprise the same elements of (for example, the same positioned digits) their respective parameter updates sequences. For example, the primary packet may comprise the first to $n^{th}$ digits of each of the sequences of digits, a second packet may comprise the $n+1^{th}$ to $n+m^{th}$ digits of each of the sequences of digits, and so on.

For example, the floating point number parameter update shown in FIG. 5a comprises, in addition to the sequence of digits defined by the mantissa, a base and an exponent. The elements of the parameter update, and of a plurality of other parameter updates in the same format, are divided into parts to be transmitted in four different packets. The parts of the parameter update that are included in each packet are denoted by the priority of that packet. The first, second, third and fourth packets have priorities $n_1$, $n_2$, $n_3$, and $n_4$ respectively. The first packet, with priority $n_1$, contains the exponent coefficient of each parameter update, the base of each parameter update and the first five digits of each parameter update's mantissa (counting the decimal point as a digit for the purpose of determining which digits are included in the packet). The second packet with priority $n_2$, contains the sixth to tenth digits of each parameter update's mantissa; the third packet with priority $n_3$, contains the eleventh to fifteenth digits of each parameter update's mantissa; and the fourth packet with priority $n_4$, contains the sixteenth to final digits of each parameter update's mantissa.

Similarly, FIG. 5b shows an example one of a plurality of binary floating point number parameter updates being divided into parts to be transmitted in four different packets with priorities denoted $n_1$, $n_2$, $n_3$, and $n_4$. The first packet, with priority $n_1$, contains the exponent coefficient of each parameter update, the signs of each parameter update and the first eight binary digits of each parameter update's mantissa. The second packet with priority $n_2$, contains the ninth to sixteenth binary digits of each parameter update's mantissa; the third packet with priority $n_3$, contains the seventeenth to twentieth binary digits of each parameter update's mantissa; and the fourth packet with priority $n_4$, contains the twenty-first to final binary digits of each parameter update's mantissa.

In a third step 430 of the method 400, the plurality of packets are transmitted from a first node with a plurality of different priorities. The primary is transmitted with a higher priority than any of the additional packets.

The first node that transmits the plurality of packets may be a node of a federated learning deployment, such as a deployment 100 as described above with reference to FIG. 1. The first node may be a node that determines the parameter updates. For example, the first node may be an edge device 120 that has determined parameter updates by training a local copy of the machine learning model using a local training dataset 130, or may be a central node 110 that has determined parameter updates to a global machine learning model by aggregating parameter updates from a plurality of edge devices 120. The first node may transmit the plurality of packets wirelessly.

The priorities with which packets are transmitted may be priorities of a quality of service (QoS) model. Packets transmitted with higher priorities may be assigned more reliable transmission techniques than packets with lower priorities. For example, packets transmitted with higher priorities may be assigned more transmission resources than packets transmitted with lower priorities. Packets with higher priorities may be assigned higher retransmission allowances than packets with lower priorities.

Figure 6:
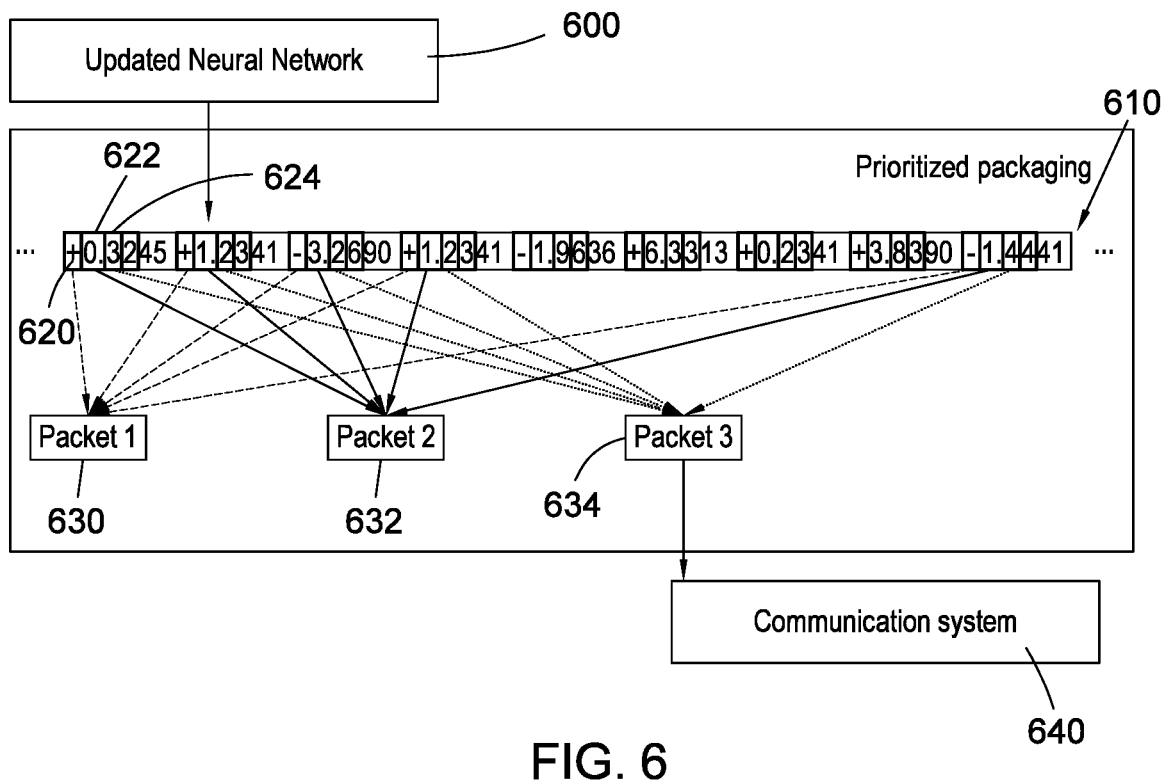
FIG. 6 shows an example of dividing a plurality of parameter updates into segments to be transmitted in a plurality of different packets with different priorities.

Some or all of the plurality of additional packets may be transmitted with different priorities. The order of the priorities with which the packets are transmitted may be the same as the order of the influences on the values of the parameter updates of the segments contained therein. For example, in the examples shown in FIGS. 5a and 5b, priority $n_1$ may be greater than $n_2$, which is greater than $n_3$, which is greater than $n_4$ FIG. 6 shows an example of a of a plurality of numerical parameter updates 610 of an updated neural network 600 being divided into segments 620, 622, 624 that are comprised by different packets 630, 632, 634 to be transmitted by a communication system 640 according to an embodiment of a method 400 as described above.

Each parameter update 610 is a signed decimal digit and is divided into a primary segment 620 comprising its sign, and a series of additional segments 622, 624 each comprising one of digits, with successively later additional segments comprising successively lower-order digits. Each of the primary segments 620 is added to a first primary packet 630, each of the segments 622 comprising the highest-order digits is added to a second additional packet 632, each of the segments comprising the second highest-order digits is added to a third additional packet 634, etcetera.

Figure 7:
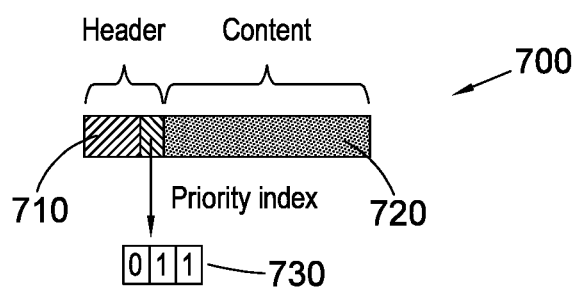
FIG. 7 shows an example of a packet structure.

The plurality of packets may each comprise a priority index 730, which may be comprised by a header 710 of the packet. FIG. 7 shows an example of a packet structure, including a header 710 with a priority index 730 and a content or payload 730, which may include a respective segment of each of the plurality of parameter updates as described above.

Figure 8:
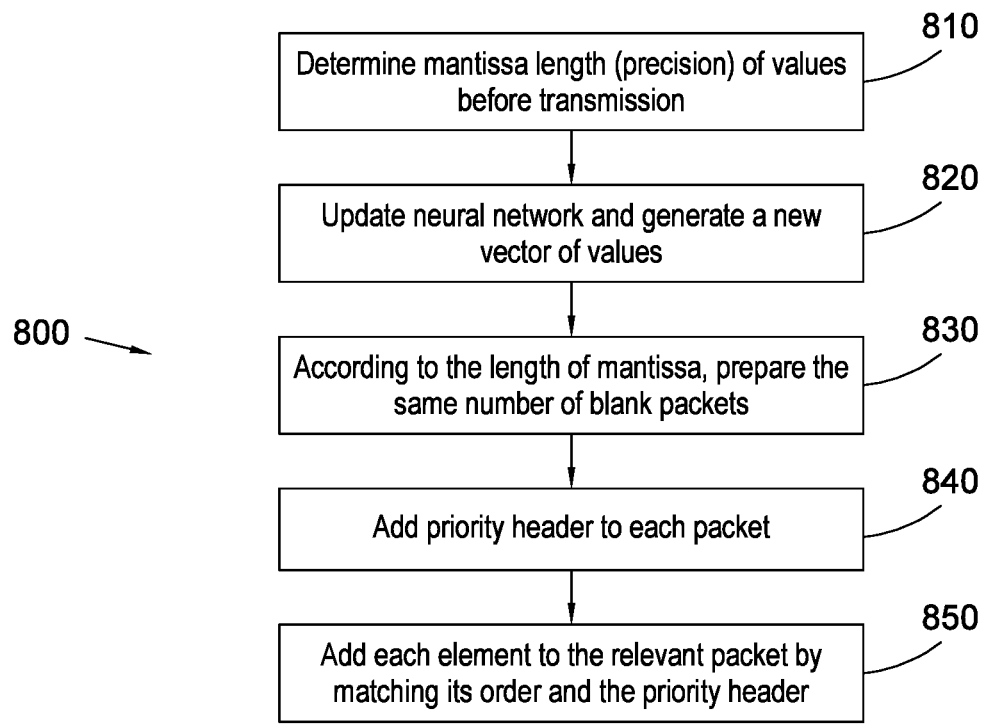
FIG. 8 is a flowchart of a method of packaging floating point parameter updates into packets.

FIG. 8 is a flowchart 800 of a method of packaging floating point parameter updates into packets according to an embodiment of a method 400 as described above. In a first step 810, the transmitters and receivers determine a length of the mantissa of the parameter updates before any transmissions, for example during deployment or periodic handshake according to different wireless system. The mantissa length of a floating point numerical parameter update determines its mathematical precision, i.e. the uncertainty in that parameter update. In a second step 820 a vector comprising the plurality of parameter updates is generated, for example by training a local copy of the neural network, or by generating an updated global copy of the neural network by aggregating parameter updates of multiple local copies. In a thirds step 830, the transmitter prepares a number of blank packets, the number of packets depending upon the mantissa length determined in the first step 810. In a fourth step 840, the transmitter adds priority header to each blank packet. In a fifth step 850, the transmitter adds each segment of each packet to a packet with a priority corresponding to the magnitude of influence on the value that segment's parameter update, by matching the order of the segments with the priority headers. After the packaging procedure 800 is complete, the constructed packets are feedforward into a wireless system.

In the wireless system, a MAC scheduling principle may be agreed by the transmitter and one or more receivers before the transmission, which may decide transmission methods, resources, and/or times. For example such a principle may decide a coding scheme, channel selections, retransmission times, and/or other transmission parameters. Generally, the wireless system can offer several prioritized QoS selections (for example, for the transmission of different types of data, such as audio, video, text, control signals, etc.). After each packet is prepared, a QoS level with which to transmit may be selected by the MAC scheduler according to the priority index 730 in its header 710. As a result, the higher priority packets always occupy more and better wireless resources, and conduct better communication performance than lower priority packets.

In some embodiments, the parameter update containing packets may be transmitted using a Long-Range (LoRa) system. In the event that a packet is dropped (i.e. not successfully received), for example due to a collision or a signal to interference and noise ratio (SINR) being lower than a threshold, that packet may be retransmitted a number of times until it is successfully received or a maximum number of retransmissions is reached. The number of times that a packet is allowed to be retransmitted may be configuration defined by the LoRa system for different QoS priority levels. Therefore packets with higher priorities can be retransmitted more times leading to a higher reliability.

Figure 9:
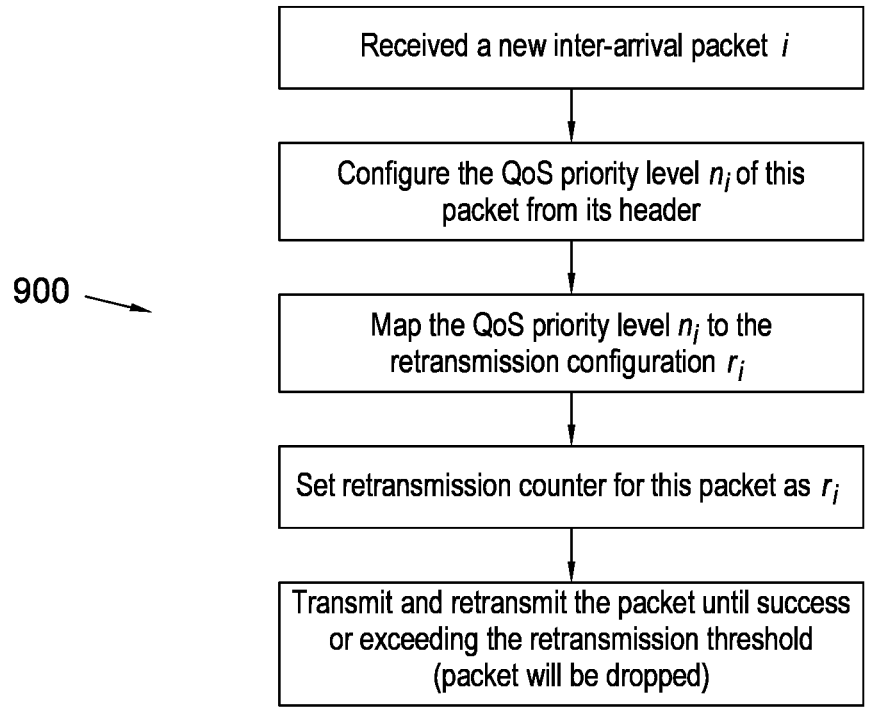
FIG. 9 is a flowchart of a method of assigning a priority to and transmitting a packet.

FIG. 9 shows a flowchart 900 of a method assigning a priority to a packet based on a priority index 730 in its header and transmitting it with a number of retransmissions dependent upon its priority.

In some embodiments, methods of communicating parameter updates described above with reference to FIG. 4, may comprise a second node (or a plurality thereof) listening to receive the primary packet and the one or more additional packets, and successfully receiving at least the primary packet. The second node may fail to receive one or more of the additional packets.

The second node may be a node of a federated learning deployment, such as a deployment 100 as described above with reference to FIG. 1. For example, the first node may be central node 110 that listens to receive parameter updates of local models trained by a plurality of edge devices 120, or may be an edge node 120 listening to receive parameter updates to a global machine learning model distributed by a central node 110.

The higher priority of the primary packet (and in some embodiments of additional packets containing additional segments with greater influences on the value of the parameter updates) increases the likelihood that those packets will be successfully received by a node listening to receive them, for example, as a consequence or retransmissions as described above.

However, it remains possible that one or more of the packets will not be successfully received, in particular additional packets transmitted with relatively low priorities. This will result in the receiving node not receiving the segments of the parameter updates contained in these packets. However providing the receiver has received the primary packet, containing the most significant segment to the value of the parameter update, the receiver will have the most important information on the value of the parameter update and can generate a value of the parameter update to use.

If a second node does not successfully receive at least one of the additional packets, the second node may determine substitute segments for each additional segment comprised by the at least one non-received packets, and may use the substitute segments to construct estimates of the parameter updates comprising segments in the non-received packets.

Determining substitute segments for the segments comprised by the at least one non-received packets may comprise determining substitute values for digits comprised by said segments. The substitute value may be any combination of: randomly generated, generated using a pre-define distribution; set to a default value (for example to zero); set to a previous value of the digit in previous updates of the same parameter; and/or generated based on one or more previous values of that digit in previous updates of the same parameter (for example, as an average thereof, or a random selection therefrom).

For example, the substituted values may be randomly generated, for example based on a pre-defined distribution. The pre-defined distribution may depend upon the format in which the parameter updates were divided into segments. For example, in embodiments in which the parameter updates are divided into segments in their decimal representation, the generation may be based on a pre-defined decimal distribution. Alternatively, in embodiments in which the parameter updates are divided into segments in a binary representation, the generation may be based on a pre-defined binary distribution.

Figure 10:
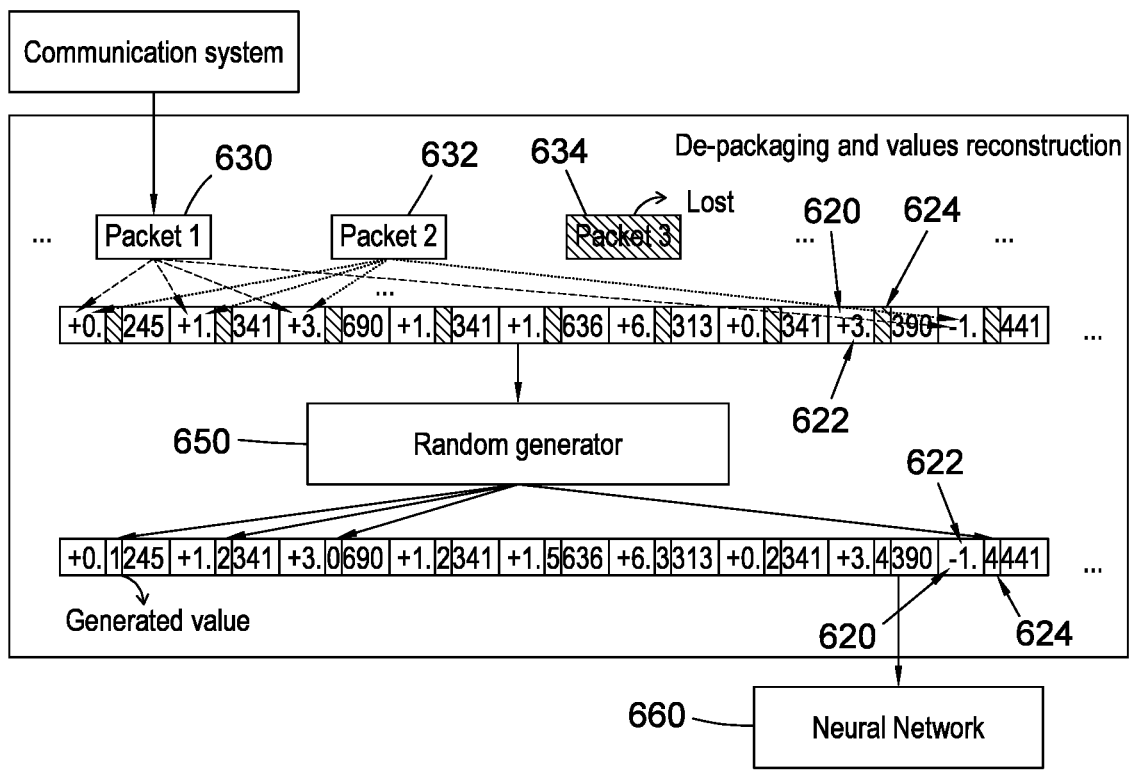
FIG. 10 shows an example of de-packaging received packets and generating values for segments contained in dropped packets.

For example, FIG. 10 shows an shows an example of de-packaging of the plurality of packets 630, 632, 634 constructed in FIG. 6 after the third packet 634, which contained the second highest order digit 624 of each of the plurality of numerical parameter updates 610 has not been successfully received. The receiving node uses a random generator 650 to generate a random second highest-order digit 624 for each of the parameter updates according to a pre-set decimal distribution. The reconstructed parameter updates are then used to update a neural network 660.

In some embodiments, the method by which substitute values for digits comprised by substitute segments may depend upon the state of training of the machine learning model. For example, during later stages of training a machine learning model, the model may be more stable, resulting in smaller changes in model parameters. Therefore, during earlier stages of training the machine learning model, substitute values may be randomly determined and/or set to default values, and in later stages of training the machine learning model, substitute values may be set to, based on, or generated using, previous values of those digits in previous updates the same parameters (where the parameter updates are new values of the updated parameters), or set to a low default value, such as zero (where the parameter updates are changes in the values of the updated parameters).

Figure 11:
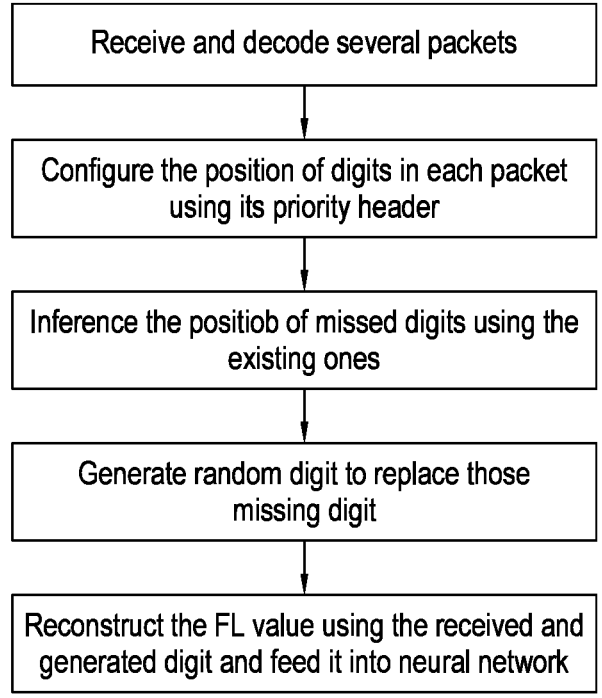
FIG. 11 is a flowchart of a method of de-packaging received packets and reconstructing values of any missing segments therein.

FIG. 11 shows a flowchart of a method of de-packaging received packets and reconstructing values of any missing segments therein.

Figure 12:
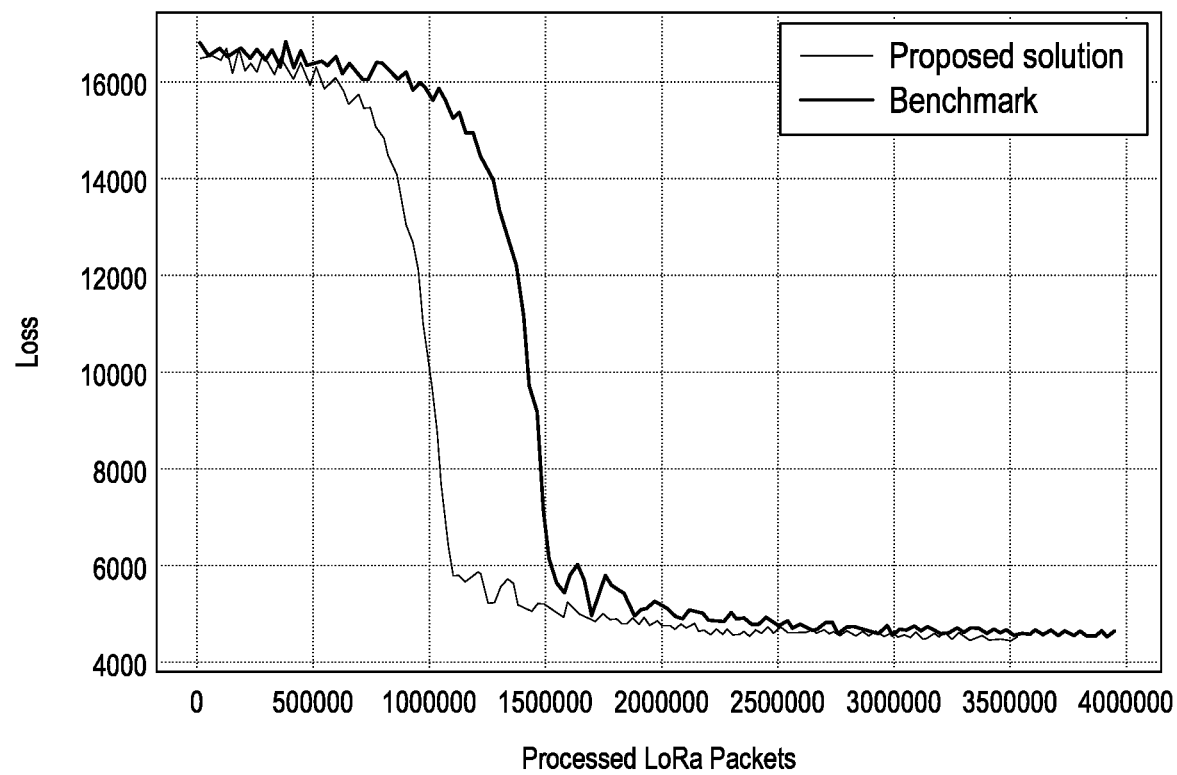
FIG. 12 shows a graph of a comparison in performance of an embodiment of a method of transmitting update parameters as described above and when using a pre-existing method in which entire parameter updates were encoded in individual packets.

FIG. 12 shows a graph of the average loss of each node of a simulated federated learning deployment per five updates using an embodiment of a method of transmitting update parameters as described above and when using a pre-existing method in which entire parameter updates were encoded in individual packets as shown in FIG. 3.

The simulated federated learning deployments were trained to perform image recognition using the Modified National Institute of Standards and Technology MNIST dataset, using an asynchronous Stochastic Gradient Descent (ASGD) algorithm in a long range (LoRa) federated learning system.

The simulated federated learning deployments each comprised four edge nodes that trained local models and communicated gradient parameter updates (changes in their parameters) to a central parameter server using the same bandwidth, 500 kHz, the same spreading factor, six, and the same coding rate, 4/5. Each node was simulated as having a 10% duty cycle. Only uplink transmissions of local model parameter updates from the edge devices to the central server were considered, downlink transmission of global model parameter from the central server to the edge devices were considered to be perfectly transmitted.

In the simulation of the embodiment of the method of packaging update parameters in segments in different packets transmitted with different priorities, the transmitted parameter updates were floating point numbers with mantissas consisting of eighteen digits and bases and exponents together consisting of four digits. Each parameter update was divided into a first primary segment comprising the exponent, the base, and the first five digits of the mantissa, a second additional segment comprising the sixth to tenth digits of the mantissa, a third additional segment comprising the eleventh to fifteenth digits of the mantissa, and a fourth additional segment comprising the sixteenth to final digits of the mantissa.

The primary segments of each parameter update were transmitted in a primary packet with a highest priority, allowing for infinite retransmissions; the second segments of each parameter update were transmitted in a second packet with a second highest priority, allowing for five retransmissions; the third segments of each parameter update were transmitted in a third packet with a second lowest priority, allowing for one retransmission; and the fourth final segments of each of the parameter updates were transmitted in a fourth packet with a lowest priority, allowing for no retransmissions.

In the simulation of the pre-existing method in which entire parameter updates were encoded in individual packets, each packet was allowed infinite retransmissions.

As shown in FIG. 12, the method of packaging update parameters in segments in different packets transmitted with different priorities allowed the neural network to be trained with a reduction of at least 30% in communication resource occupation while maintaining the same accuracy.

Figure 13:
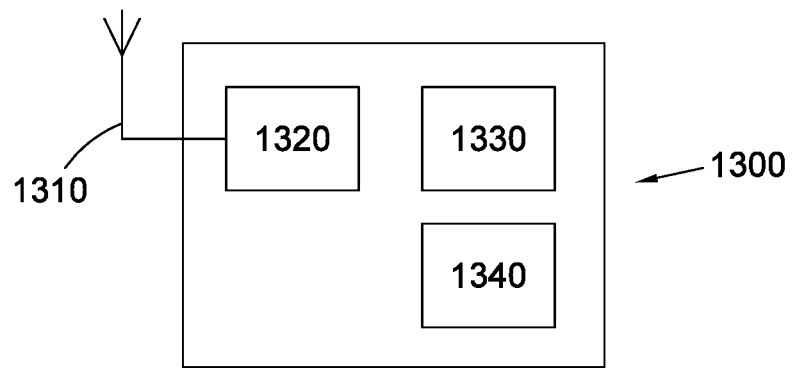
FIG. 13 shows an example of a node of a federated learning deployment.

FIG. 13 shows an example of a node 1300 of a federated learning deployment, such as an edge device or a central server. The node comprises an antenna 1310, an input/output module 1320, a memory 1330 and a processor 1340.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method comprising:
dividing a numerical parameter update of a machine learning model into a primary segment and one or more additional segments, the numerical parameter update being communicated from a first node to a second node using a sequence of one or more packets, wherein the primary segment of the numerical parameter update is a segment that has a predetermined influence on a value of the numerical parameter update, a packet including the segment that has the predetermined influence being transmitted with a highest priority:
constructing a primary packet containing the primary segments of the numerical parameter update, and one or more additional packets including the one or more additional segments of the plurality of parameter updates; and
transmitting the primary packet and the one or more additional packets from the first node, wherein the primary packet is transmitted with a higher priority than any of the one or more additional packets;
wherein if the second node does not receive at least one of the one or more additional packets, the second node constructs estimates of a numerical parameter update including an additional segment contained in one of the at least one of the one or more additional packets.

2. The method according to claim 1, further comprising:
the second node listening to receive the primary packet and the one or more additional packets;
wherein, if the second node does not receive at least one of the one or more additional packets, the second node determines substitute segments for the one or more additional segments included in the at least one of the one or more additional packets, and uses the substitute segments to construct the estimates of a numerical parameter update including an additional segment contained in one of the at least one of the one or more additional packets.

3. The method according to claim 2, wherein one or more values of digits in the substitute segments are randomly generated.

4. The method according to claim 3, wherein one or more values of digits in the substitute segments are randomly generated based on a predefined distribution.

5. The method according to claim 2, wherein one or more values of digits in the substitute segments are generated based on one or more previous values of a digit in previous parameter updates of the same parameter.

6. The method according to claim 2, wherein one or more values of digits in the substitute segments are set to a default value.

7. The method according to claim 2, further comprising a process of training a machine learning model in a federated learning deployment, comprising transmitting the numerical parameter updates at a plurality of stages;
wherein in one or more earlier stages, values of digits in the substitute segments are randomly generated or set to default values; and wherein later stages the values of digits in the substitute segments are randomly generated or set to default values; and
wherein in one or more later stages, the values of digits in the substitute segments are generated based on one or more previous values of those digits in previous parameter updates of the same parameters.

8. The method according to claim 1 wherein the first node is anode of a federated learning deployment.

9. The method according to claim 1, wherein numerical parameter update is a floating-point number including an exponent and a mantissa;
wherein the primary segment of the numerical parameter update includes the exponent of the numerical parameter update.

10. The method according to claim 9 wherein the primary segment of the numerical parameter update further includes one or more highest-order digits of the mantissa of the numerical parameter update.

11. The method according to claim 1, wherein the primary packet and the one or more additional packets of the numerical parameter update define a series of packets, with the primary segment having the predetermined influence on the value of the numerical parameter update, and a sequential subsequent additional packet of the series having a lower influence on the value of the numerical parameter update.

12. The method according to claim 11, wherein the one or more additional packets are transmitted with different priorities and an order of the priorities with which the additional packets are transmitted is the same as an order of influences on values of the numerical parameter updates of segments contained in the one or more additional packets.

13. The method according to claim 1 wherein the each of the numerical parameter updates includes a sign and the primary segment of each parameter comprises the respective sign of the numerical parameter update.

14. The method according to claim 1 wherein packets transmitted with higher priorities are allowed greater numbers of retransmissions than packets transmitted with lower priorities.

15. The method according to claim 1, wherein the numerical parameter updates is divided into segments in the same manner.

16. One or more non-transitory storage media comprising computer instructions executable by a one or more processing means, the computer instructions when executed by the processing means causing a first node to:

divide a numerical parameter updates of a machine learning model into a primary segment and one or more additional segments, the numerical parameter update being communicated from the first node to a second node using a sequence of one or more packets, wherein the primary segment of the numerical parameter update is a segment that has a predetermined influence on a value of the numerical parameter update, a packet including the segment that has the predetermined influence being transmitted with a highest priority;

construct a primary packet containing the primary segments of the numerical parameter updates, and one or more additional packets including the one or more additional segments of the numerical parameter update; and transmit the primary packet and the one or more additional packets from the first node, wherein the primary packet is transmitted with a higher priority than any of the one or more additional packets, wherein if the second node does not receive at least one of the one or more additional packets, the second node constructs estimates of a numerical parameter update including an additional segment contained in one of the at least one of the one or more additional packets.

17. A network node comprising one or more processors coupled to one or more memories storing executable instructions and configured to:

divide a numerical parameter updates of a machine learning model into a primary segment and one or more additional segments, the numerical parameter update being communicated from a first node to a second node using a sequence of one or more packets, wherein the primary segment of the numerical parameter update is a segment that has a predetermined influence on a value of the parameter update, a packet including the segment that has the predetermined influence being transmitted with a highest priority;

construct a primary packet containing the primary segments of the numerical parameter updates, and one or more additional packets including the one or more additional segments of the numerical parameter updates; and transmit the primary packet and the one or more additional packets from the first node, wherein the primary packet is transmitted with a higher priority than any of the one or more additional packets, wherein if the second node does not receive at least one of the one or more additional packets, the second node constructs estimates of a numerical parameter update including an additional segment contained in one of the at least one of the one or more additional packets.

\* \* \* \* \*